March 3, 1970  R. E. COWLING ETAL  3,498,036
MOWING APPARATUS
Filed March 13, 1968  5 Sheets-Sheet 5
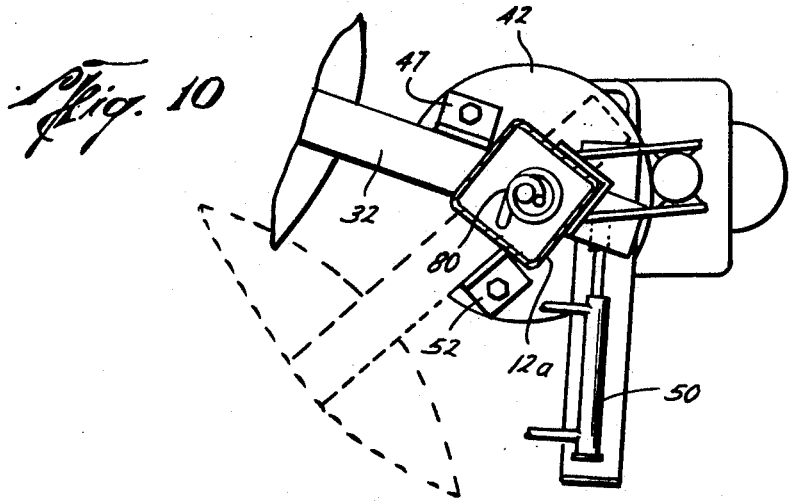
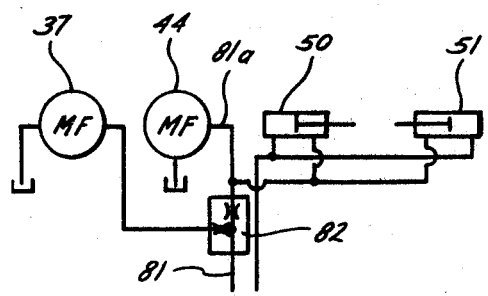
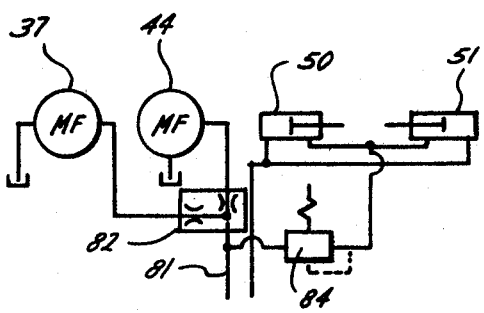
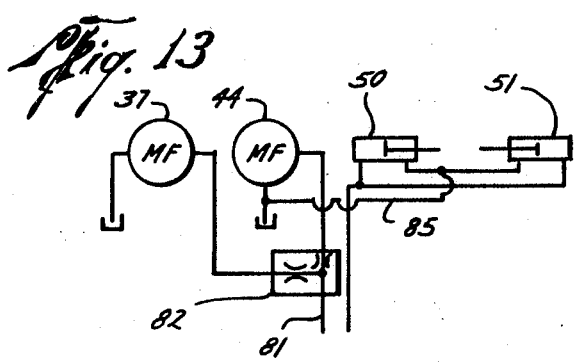
Robert E. Cowling
William H. Harris
Carl W. Lafitte
INVENTORS
BY
ATTORNEYS

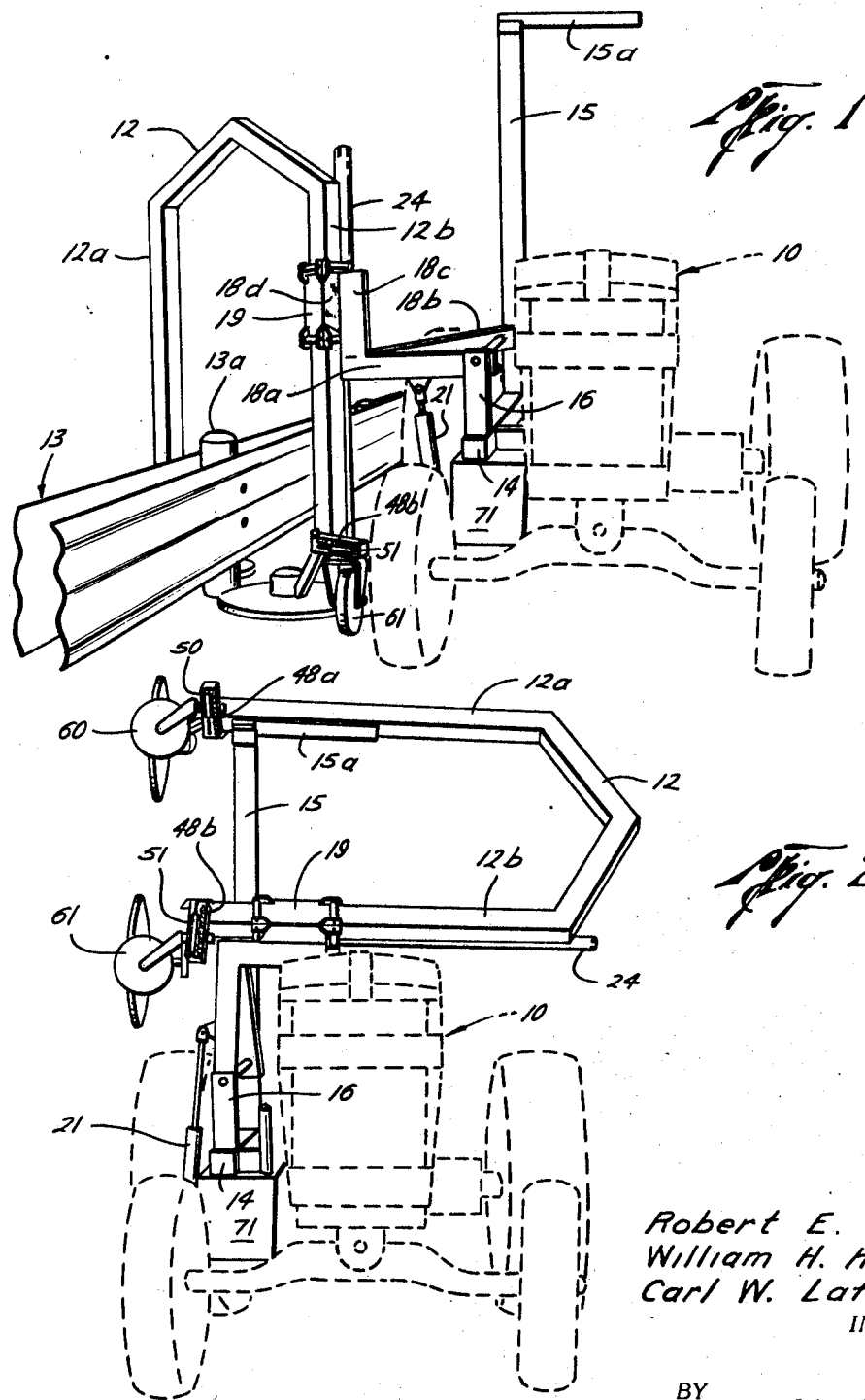

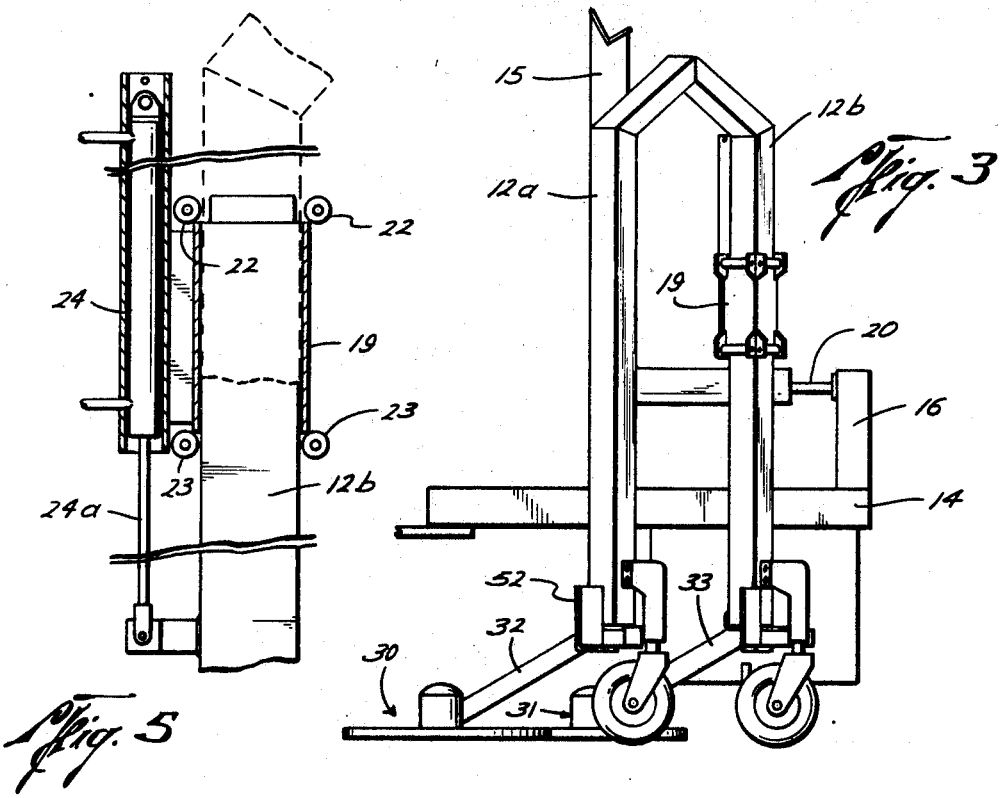
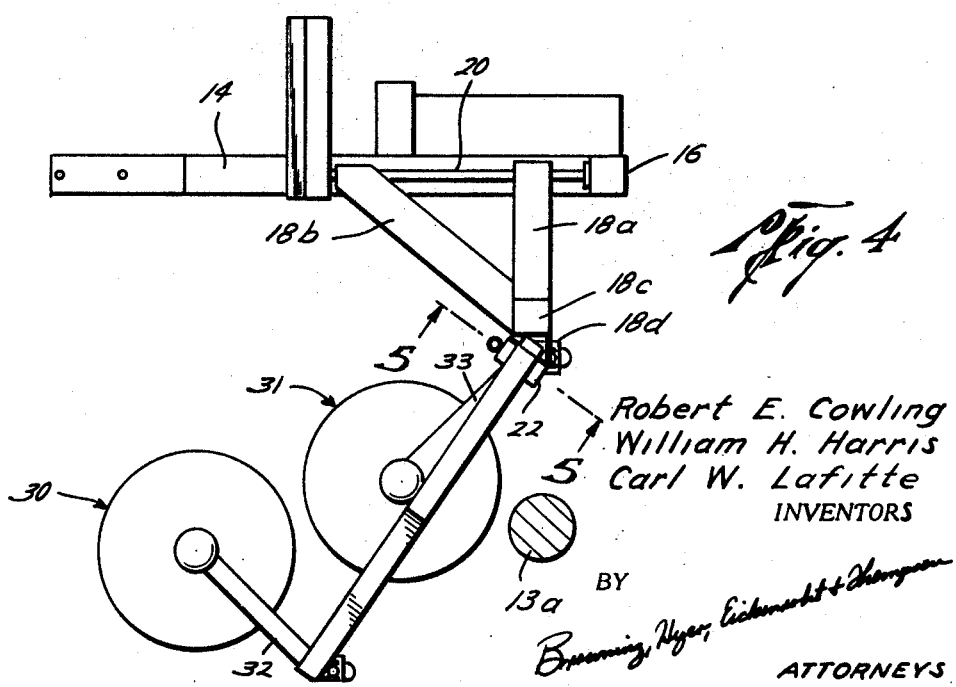

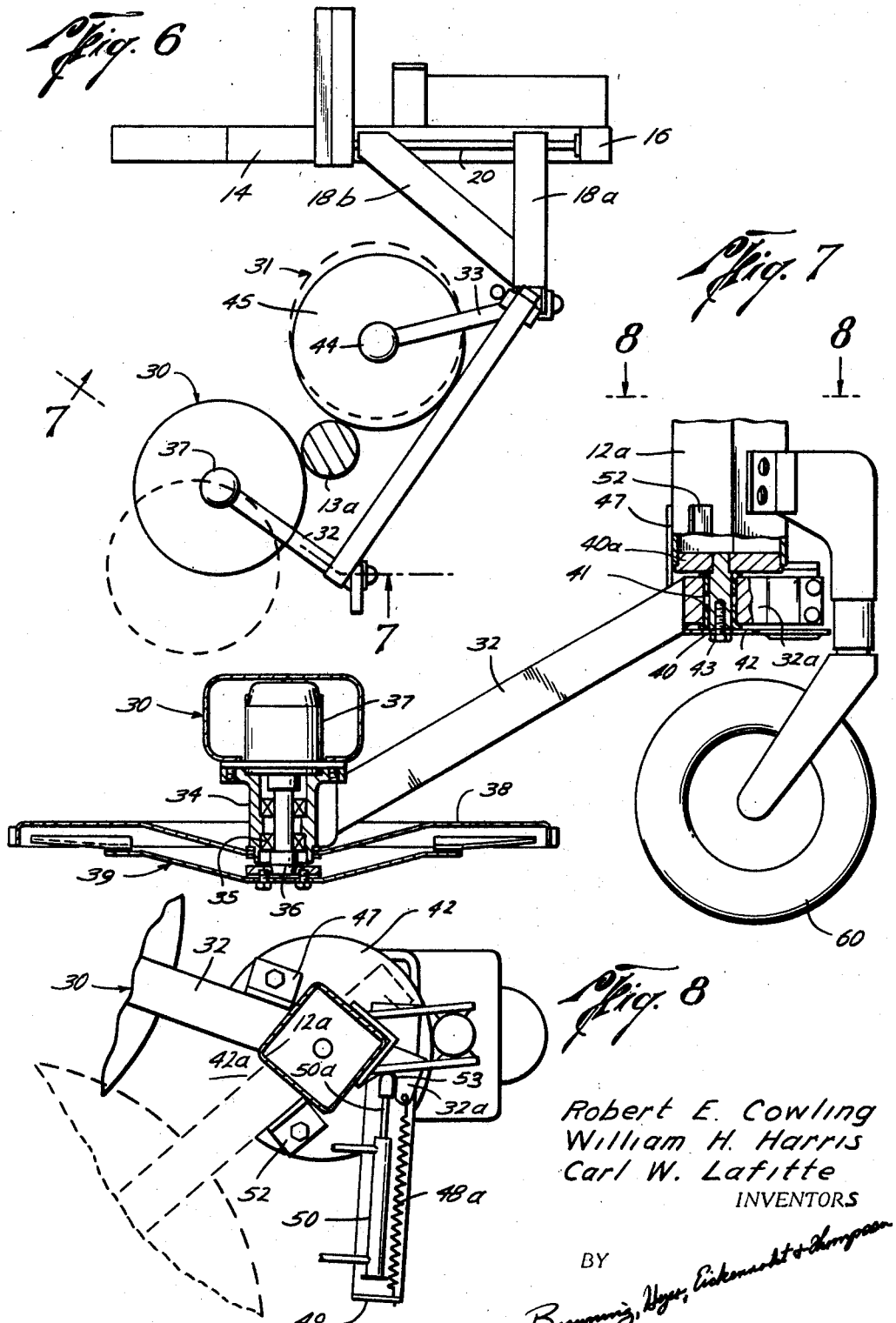

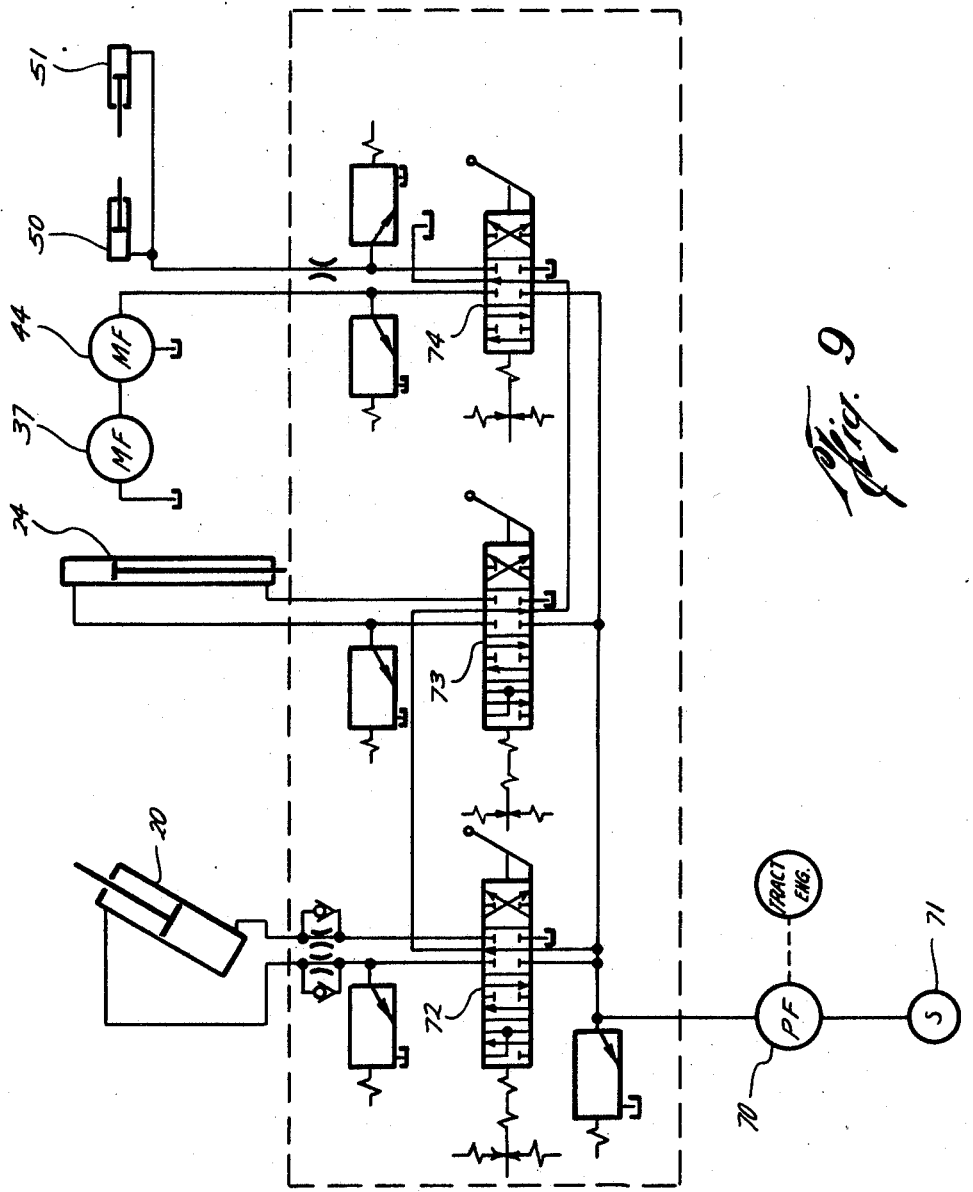

United States Patent Office 3,498,036
Patented Mar. 3, 1970

3,498,036
MOWING APPARATUS
Robert E. Cowling, William H. Harris, and Carl Wayne Lafitte, Houston, Tex., assignors to Astron Corporation, Houston, Tex., a corporation of Texas
Filed Mar. 13, 1968, Ser. No. 712,684
Int. Cl. A01d 35/26
U.S. Cl. 56—25.4                    9 Claims

ABSTRACT OF THE DISCLOSURE

An inverted U-shaped yoke is mounted on a tractor for the spaced, parallel legs of the yoke to be positioned on opposite sides of a fence. A mower head is supported by each leg. The mower heads mow overlapping swaths with a portion of both swaths extending below the fence. The mower heads are mounted on the legs of the yoke to move around the fence posts. The yoke is movable from an operating position astraddle a fence to a traveling position. In the traveling position the yoke does not increase the width of the tractor substantially, if at all, so the tractor does not exceed highway width limitations.

---

This invention relates to mowing apparatus, generally and, in particular, to mowing apparatus for mowing under and along both sides of a fence.

To simultaneously mow along both sides of a fence, as well as under it, two mower heads are used, one on each side of the fence. For an example of such an arrangement see Thoen et al., U.S. Patent No. 3,115,739, entitled "Fence Row Mower Attachment for Farm Tractor," which issued Dec. 31, 1963.

Providing a good simple support for the mower heads, particularly the one on the side of the fence away from the tractor or mobile carrier upon which the mowing apparatus is mounted, has been a problem. It is an object of this invention to provide such a support for the mower heads of this type of mowing apparatus, in which the improved support is of strong yet simple construction, and in which one unitary structural member provides support for both mower heads.

Another problem with mowing apparatus of this type is that it usually extends laterally from the side of the tractor or other mobile carrier upon which it is mounted so far that the total width of this mowing apparatus, i.e., the width of the tractor plus the distance the mowing apparatus extends outwardly from the side thereof, is more than what most states will allow on their highways and roads. This creates a problem when it is desired to move the equipment from job to job down a road or highway.

Therefore, it is an object of this invention to provide mowing apparatus for mounting on a mobile carrier for mowing under and on both sides of a fence simultaneously, which can be positioned laterally of the mobile carrier for mowing and which can also be quickly and easily positioned above the mobile carrier for movement down a highway or road with the total width of the equipment less than the maximum vehicle width allowed for such vehicles, when traveling on a road or highway.

It is another object of this invention to provide such apparatus in which the mower heads can move up and down independently of the mobile carrier upon which the apparatus is mounted to relieve the operator of having to adjust the height of the mower head above the ground as the elevation of the ground over which the tractor travels changes with respect to that over which the mower heads are moving.

It is another object of this invention to provide improved mowing apparatus for mowing under and along both sides of a fence simultaneously that employs an inverted, U-shaped yoke, as a support member for the mower heads, which allow the mower heads to be positioned on opposite sides of a fence by positioning the yoke astride the fence and which allows the mower heads and associated apparatus to be positioned above the mobile carrier upon which the apparatus is mounted to reduce the width of the mobile carrier and apparatus to a minimum for moving down a highway by pivoting the yoke to a position extending over the mobile carrier.

These and other objects, advantages, and features of this invention will be apparent to those skilled in the art from a consideration of this specification, attached drawings, and appended claims.

The invention will now be described in detail in connection with the attached drawings in which, FIGURE 1 is a front view in elevation of the preferred embodiment of the apparatus of this invention mounted on a tractor, which is shown in dotted lines, and in its operating position for mowing under and along both sides of a fence or guard rail;

FIGURE 2 is a front view in elevation of the apparatus of FIGURE 1 in its traveling position above the tractor;

FIGURE 3 is a side view in elevation of the apparatus of FIGURE 1 in its operating position;

FIGURE 4 is a top plan view of the apparatus shown in FIGURE 3 as the apparatus approaches a fence post;

FIGURE 5 is a sectional view taken along line 5—5 of FIGURE 4;

FIGURE 6 is a top view similar to FIGURE 4 showing in dotted lines the maximum lateral movement of the mower heads as they move around a fence post;

FIGURE 7 is a sectional view taken along line 7—7 of FIGURE 6;

FIGURE 8 is a sectional view taken along line 8—8 of FIGURE 7;

FIGURE 9 is a flow diagram of the hydraulic system employed to power the apparatus shown in the previous figures;

FIGURE 10 is a view similar to FIGURE 8 of an alternate embodiment of this structure; and FIGURES 11, 12 and 13 are alternate arrangements of a portion of the hydraulic system in FIGURE 9.

The mowing apparatus is adapted to be mounted on a mobile carrier, such as tractor 10, shown in dotted lines in FIGURES 1 and 2. The moving apparatus includes an inverted, U-shaped yoke or support member 12 having spaced parallel legs 12a and 12b. Means are provided for mounting the yoke on tractor 10 to extend laterally therefrom and straddle a fence with its legs extending downwardly on opposite sides thereof and for pivotal movement between that position and one over the tractor. These two positions are shown in FIGURES 1 and 2, respectively. In FIGURE 1, the yoke is in its operating position with its legs substantially vertical and and astride guard rail 13. In FIGURE 2, the yoke is in its traveling position with its legs substantially horizontal and extending over the top of the tractor.

In the embodiment shown, the means for so mounting the yoke includes horizontal beam 14, which is attached to the frame of the tractor, and two spaced vertical posts 15 and 16 supported by beam 14. The yoke is pivotally supported on posts 15 and 16 by pivot arms 18a and 18b, sleeve 19 and shaft 20. Sleeve 19 is square in cross section and is attached to the end of pivot arm 18a with the side nearest the tractor making an angle of about 35° with a line parallel to the direction of travel of the tractor. Sleeve 19 is attached to arm 18a by post 18c and gusset plate 18d. The post is square and has one corner in contact with and welded to one corner of the sleeve. Gusset 18d bridges the gap between the other adjacent corners of the post and the sleeve. Pivot arm 18b has one end attached to arm 18a adjacent the sleeve and extends from arm 18a at an angle to provide lateral support for the arm. Shaft 20 extends through the inboard ends of both pivot members to permit the arms, sleeve 20 and yoke 12 to pivot around the longitudinal axis of the shaft. The yoke is supported on this mounting assembly by leg 12b, which extends through sleeve 19, as shown in FIGURE 5.

Means are provided to pivot the yoke between its operating position and its traveling position. In the embodiment shown, double acting hydraulic cylinder 21 is provided for this purpose. The cylinder is attached to the frame of the tractor and its rod is attached to pivot arm 18a at a point spaced from shaft 20. Actuation of power cylinder 20 will move pivot arm 18a and yoke 12 between the two positions shown in FIGURE 1 and FIGURE 2. When the yoke is in its traveling position, leg 12a is supported by angle 15a fixed to the top of post 15.

Means are provided for moving the yoke relative to its mounting means parallel to the longitudinal axis of its legs. In the embodiment shown, leg 12b of the yoke extends through sleeve 19 and is supported for longitudinal movement along the axis of the sleeve and the longitudinal axis of the leg by rollers 22 and 23. Both the yoke and the sleeve are square in transverse cross section. Four rollers 22 are mounted at the top and four rollers 23 are mounted at the bottom of the sleeve to engage all four sides of the yoke on both sides of the sleeve. This keeps the yoke from rotating around the longitudinal axis of leg 12b relative to the sleeve. Thus, the yoke extends laterally from the tractor at an angle determined by the angle through which sleeve 19 is rotated, which in the embodiment shown is 35°.

To move the yoke in the sleeve, double acting hydraulic cylinder 24 is attached to the sleeve and rod 24a is attached to leg 12b of the yoke, as shown in FIGURE 5. By supplying cylinder 24 with hydraulic fluid, the cylinder will move leg 12b and the yoke parallel to the longitudinal axis of its legs relative to sleeve 19. With this arrangement, the yoke can be moved vertically relative to the guard rail until it is clear of the guard rail before it is pivoted to the position shown in FIGURE 2 with the yoke extending over the tractor. Also, this allows the yoke to be positioned over the tractor so that it extends a minimum distance laterally of the tractor, when in its traveling position.

Mower heads 30 and 31 are pivotally connected to the ends of yoke legs 12a and 12b by mower support arms 32 and 33, respectively. The support arms are connected to the legs of the yoke and to the mower heads they support in the same way so only the connections between support member 32, legs 12a, and mower head 30, as shown in FIGURES 7 and 8 will be described in detail.

As shown, one end of support member 32 is connected to shaft housing 34 of mower head 30. Located in the shaft housing are bearings 35, which support output shaft 36 of hydraulic motor 37. The hydraulic motor is also mounted on shaft housing 34. Cutter blade assembly 39 is attached to the output shaft and is rotated thereby. Guard 38 is attached to shaft housing 34 and covers the top and the side of the cutter blade assembly.

End 32a of the support member that is connected to leg 12a of the yoke is bent out of alignment with the remainder of the support member to position mower head 30 some distance below the end of yoke leg 12a to which it is attached. The support member is pivotally attached to leg 12a by pin 40. The pin extends through an opening in the support member in which is located journal bearings 41 and is welded to plate 40a attached to the bottom of leg 12a. Circular retaining plate 42 is connected to pin 40 by bolt 43 to hold the bearings and the support member in position on shaft 40. Thus, support member 32 can pivot around pin 40 to permit mower head 30 to move in a plane perpendicular to the longitudinal axis of the pin and of leg 12a of the yoke. Notch 42a is cut out of plate 42 to permit such movement of the support arm.

Mower head 31, which includes hydraulic motor 44 and guard 45, as well as cutting means (not shown), is mounted in the same manner to leg 12b of the yoke through support member 33.

When yoke 12 is in its operating position, as shown in FIGURE 1, mower heads 30 and 31 will be positioned on opposite sides of guard rail 13. The support members for the mower heads can pivot and move the mower heads toward each other. Stop means are provided to limit the distance the mower heads can move together to position the mower heads so that they will cut overlapping, parallel swaths, and thereby cut the grass below and along both sides of the guard rail. Resilient means are provided to hold the mower heads in such a position.

As shown in FIGURE 8, L-shaped stop 47 is attached to plate 42 to limit the distance support arm 32 can be rotated around shaft 40 in a clockwise direction. Stop 47 is positioned so that when support arm 32 is in engagement with it, mower head 30 will be positioned relative to the yoke as shown in FIGURE 4. A similar stop is arranged for support arm 33 so that mower head 31 will be positioned as shown in FIGURE 4, when support arm 33 is in engagement with its stop. In this position the mower heads will cut overlapping swaths, which will cut the grass both beneath guard rail 13 and along both sides thereof.

To resiliently hold mower head 30 in this position, spring 48a has one end connected to bracket 49, which is attached to plate 42, and its other end attached to end 32a of support arm 32. When the mower head 30 encounters posts, such as post 13a of the guard rail, it can move laterally to the dotted line position shown in FIGURE 6 by stretching spring 48a and moving around the post. After clearing the post, spring 48a will return the mower head into position to cut under the guard rail. A similar spring 48b, is arranged to permit mower head 31 to move to the dotted line position shown in FIGURE 6 so it can move around posts, also.

When moving the yoke into position astride a fence, the mower heads need to be swung away from their operating stops so they will not hand up on the top of the fence as the yoke is lowered over it. To permit the operator to move the mower heads apart far enough to clear a fence, hydraulic cylinders 50 and 51 are provided. As shown in FIGURE 8, hydraulic cylinder 50 is mounted on bracket 49 with the end of its piston rod in engagement with notch 53 in the end of support arm 32. By actuating this hydraulic cylinder and extending its rod 50a, support arm 32 will be swung in a counterclockwise direction, as viewed in FIGURE 8, into engagement with stop 52. When in this position, mower head 30 is well out of the way and yoke 12 can be lowered over a fence without interference from the mower head. Cylinder 51 is mounted in a similar manner with respect to support arm 33 to swing mower head 31 out of the way, when lowering the yoke over a fence. After the yoke is in position, pressure can be released from these hydraulic cylinders and springs 48a and 48b associated with the support arms will swing them into position under the fence or guard rail to cut the grass in the desired manner. Hydraulic cylinders 50 and 51 are also employed when it is time to remove the yoke from its position astride a fence. They move the mower heads laterally out from under the fence and hold them out of the way as the yoke is moved up by hydraulic cylinder 24 until the mower heads are clear of the fence. The mower heads can then be released to return to their original position.

Often the elevation of the ground over which the tractor will travel will vary from that over which the mower heads are traveling. When such variations do occur, if the operator is not quick to change the height of the yoke, the mower heads can hit the ground. To avoid this, casters 60 and 61 are attached to legs 12a and 12b to engage the ground and support the yoke the desired distance above the ground to cut the grass at the proper length. In operation, the yoke is lowered by cylinder 24 until the casters engage the ground. Pressure is then released from this cylinder to permit the yoke to move up and down in sleeve 19, as required to follow the changing elevation of the ground with respect to the ground over which the tractor travels. This relieves the operator from having to pay close attention to the elevation of the mower heads above the ground, which allows him to devote more attention to the direction of travel of the tractor and the operation of the apparatus.

The hydraulic system for the apparatus described above is shown diagrammatically in FIGURE 9. Hydraulic pump 70 may be driven by the tractor engine as shown or by a separate engine mounted on the tractor. Hydraulic fluid is supplied to the pump by sump tank 71, which is shown in FIGURES 1 and 2 as being located below beam 14 on the right-hand side of the tractor. Control valves 72 and 73 control the supply of hydraulic fluid to pivot cylinder 20 and lift cylinder 24. Valve 74 controls the flow of hydraulic fluid to swing-out cylinders 50 and 51 and also to hydraulic motors 37 and 44 that drive the mower heads. By using one valve for this, whenever pressure is being supplied to the swing-out cylinders 50 and 51, no hydraulic fluid can flow to mower head motors 37 and 44. This insures that the mower heads are cut off before they are swung out for removal from or for positioning over a fence or guard rail.

FIGURE 10 illustrates an alternate embodiment of the structure shown in FIGURE 8. In FIGURE 10, coil spring 48a has been replaced by torsion spring 80. The upper end of spring 80 is fixed to leg 12a and the lower end of the spring is attached to an extension (not shown) of pin 40 (FIGURE 7). Pin 40 in this embodiment is rotatably supported by suitable bearings (not shown) on plate 40a and the pin is arranged to rotate with support member 32. Spring 80 is wound so that it will hold arm 32 against stop 47 and resiliently resist its movement therefrom thereby performing the same function as coil spring 48a, in FIGURE 8.

Spring 48a, along with spring 48b, can also be replaced if hydraulic cylinders 50 and 51 are double acting and are connected into the hydraulic system as shown in either of FIGURES 11, 12, or 13. So connected there will be pressure on the rod side of the pistons in the cylinders which will supply the forces previously provided by the springs Hydraulic pressure can be supplied to the rod side of the piston in cylinders 50 and 51 in various ways. For example, in FIGURE 11, hydraulic line 81 instead of being connected directly to fluid motor 44 is connected into divider valve 82, which divides the flow of hydraulic fluid more or less equally between fluid motor 44 and fluid motor 37. This particular arrangement has advantages over that shown in FIGURE 9, where the two motors 37 and 44 are connected in series in line 81, and can be used in that system, if desired. Upstream of divider 82, section 81a of line 81 is connected to the rod side of cylinders 50 and 51. Since the pressure going to motor 44 may be quite high, it may be necessary to increase the diameter of the piston rods of cylinders 50 and 51 to reduce the area over which this pressure acts. It is desired that this force be no more than is necessary so that the mower heads can readily swing around the posts they encounter, while mowing below a fence.

An alternate arrangement is shown in FIGURE 12. Here the rod side of cylinders 50 and 51 are connected to line 81 upstream of divider valve 82 by line 84. Pressure reducing valve 84a is placed in line 84 to permit the pressure acting on the rod side of the pistons of cylinders 50 and 51 to be adjusted so the cylinders will exert the desired force on the support arms of the mower heads.

FIGURE 13 shows yet another way of accomplishing this. In this arrangement, the rod side of cylinders 50 and 51 are connected into the system downstream of hydraulic motor 44 by line 85. Usually, the pressure in the system at this point is such that no reduction will be required.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Mowing apparatus adapted to be mounted on a mobile carrier to mow under and along each side of a fence having spaced posts, comprising an inverted U-shaped supporting yoke having spaced generally parallel legs, means for mounting the yoke on a mobile carrier to extend laterally therefrom to straddle a fence with its legs extending downwardly on opposite sides thereof, two mower heads, each including cutting means and a guard positioned to engage rigid obstacles in the path of the cutting means, means mounting each mower head on one of the legs of the U-shaped yoke to position the mower heads on opposite sides of the fence that is straddled by the legs of the yoke to mow overlapping swaths on opposite sides of such fence and for movement away from and toward the fence, stop means for limiting the distance each mower head can move toward the fence, and means resiliently urging each mower head toward the fence to permit the mower head guards to move the mower heads around posts encountered by the guards as the mowing apparatus is moved along a fence row by a mobile carrier.

2. The mowing apparatus of claim 1 in which the supporting frame makes an angle with the line of the fence and the means mounting each mower head includes supporting arms that are substantially equal in length.

3. The mowing apparatus of claim 1 in which the yoke mounting means includes means for supporting the yoke for movement parallel to the longitudinal axis of the legs and means for moving the yoke along said axis to adjust the height of the mower head above the ground.

4. The mowing apparatus of claim 1 in which the yoke mounting means includes means mounting the yoke for pivotal movement between an operating position with its legs substantially vertical and a traveling position with its legs substantially horizontal, and means for moving the yoke between its operating and traveling positions.

5. The mowing apparatus of claim 1 further provided with means for moving the mower heads in opposite directions away from a fence when moving the yoke from or into a position straddling a fence.

6. Mowing apparatus adapted to be mounted on a mobile carrier to mow under and along both sides of a fence having spaced vertical posts, comprising an inverted U-shaped yoke having spaced parallel legs, means for mounting the yoke on a mobile carrier for pivotal movement between an operating position extending laterally from the carrier with its legs substantially vertical to straddle a fence and a traveling position with its legs substantially horizontal and extending over such carrier, means for moving the yoke between said positions, two mower head support arms, each arm having one end pivotally attached to one of the legs of the yoke and the other end located laterally of the leg, a mower head attached to said laterally-positioned end of each support arm, means for resiliently urging each support arm to pivot to move the mower head its supports toward the other mower head, and stop means for limiting the distance the support arms can be pivoted to move the mower heads toward each other to position the mower heads to mow overlapping parallel swaths.

7. The mowing apparatus of claim 6 further provided with means for moving the yoke on said mounting means generally parallel to the longitudinal axis of its legs to adjust the height of the ends of the legs above the ground when the yoke is in its operating position and to adjust the position of the yoke relative to a mobile carrier when in its traveling position to permit the distance the apparatus extends laterally of such carrier to be kept to a minimum.

8. The mowing apparatus of claim 7 in which each leg of the yoke is further provided with ground-engaging wheels and means are provided for relaxing said means for moving the yoke on the mounting means, when the yoke is in its operating position, to allow the yoke to be supported by said ground-engaging wheels and to be moved vertically by said wheels to maintain the mower heads a given distance above the ground over which they travel.

9. The mowing apparatus of claim 6 further provided with means for pivoting each support arm to move the mower head it supports away from the other mower head to permit the yoke to be positioned astraddle a fence and to permit it to be removed therefrom.

References Cited

UNITED STATES PATENTS

| | | | |
|---|---|---|---|
| 3,045,413 | 7/1962 | Sheffer | 56—25.4 |
| 3,115,739 | 12/1963 | Thoen et al. | 56—25.4 XR |
| 3,241,302 | 3/1966 | Barry | 56—25.4 |
| 3,261,150 | 7/1966 | Fitzgerald | 56—25.4 |
| 3,397,521 | 8/1968 | Danuser | 56—25.4 |

ANTONIO F. GUIDA, Primary Examiner

JAMES A. OLIFF, Assistant Examiner